US009893944B2

(12) United States Patent
Allen et al.

(10) Patent No.: US 9,893,944 B2
(45) Date of Patent: Feb. 13, 2018

(54) MANAGING NETWORK BANDWIDTH BASED ON COGNITIVE ANALYSIS OF SITE CONTENT AGAINST ORGANIZATIONAL NEEDS

(71) Applicant: International Business Machines Corporation, Armonk, NY (US)

(72) Inventors: Corville O. Allen, Morrisville, NC (US); Andrew R. Freed, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 426 days.

(21) Appl. No.: 14/503,628

(22) Filed: Oct. 1, 2014

(65) Prior Publication Data
US 2016/0099846 A1 Apr. 7, 2016

(51) Int. Cl.
*G06F 15/16* (2006.01)
*H04L 12/24* (2006.01)

(52) U.S. Cl.
CPC ...... *H04L 41/0896* (2013.01); *H04L 41/5009* (2013.01); *H04L 41/509* (2013.01); *H04L 41/5067* (2013.01)

(58) Field of Classification Search
CPC ............. H04L 41/0896; H04L 41/5009; H04L 41/5067; H04L 41/509
USPC .................................. 709/223, 224, 203, 217
See application file for complete search history.

(56) References Cited

U.S. PATENT DOCUMENTS

| 5,835,667 | A | 11/1998 | Wactlar et al. |
| 2003/0172167 | A1* | 9/2003 | Judge .................... H04L 12/585 709/229 |
| 2006/0026678 | A1 | 2/2006 | Zakas |
| 2008/0298284 | A1* | 12/2008 | Dawson ................ G06Q 30/08 370/310 |
| 2012/0173746 | A1* | 7/2012 | Salinger ............. H04L 41/5019 709/230 |
| 2012/0203747 | A1 | 8/2012 | Douetteau et al. |
| 2014/0143753 | A1* | 5/2014 | Chappel .................. G06F 8/315 717/106 |

(Continued)

OTHER PUBLICATIONS

Winstein et al., "TCP ex Machina: Computer-Generated Congestion Control," ACM Special Interest Group on Data Communication SIGCOMM '13, Hong Kong, Aug. 2013, pp. 123-134.

(Continued)

*Primary Examiner* — Bryan Lee
*Assistant Examiner* — Oluwatosin Gidado
(74) *Attorney, Agent, or Firm* — VanLeeuwen & VanLeeuwen; Diana R. Gerhardt

(57) ABSTRACT

An approach is provided in which a network bandwidth manager receives a first request to access site content from a source site over a computer network. The network bandwidth manager analyzes the site content against a domain corpora that corresponds to one or more organizational needs of an organization. When the network bandwidth manager receives a second request corresponding to the source site, the network bandwidth manager modifies a quality of service of the computer network to access the source site based upon the previous analysis. In turn, the network bandwidth manager provides access to the source site over the computer network utilizing the modified quality of service.

17 Claims, 9 Drawing Sheets

(56) References Cited

U.S. PATENT DOCUMENTS

2014/0185453 A1\* 7/2014 Hwang ............... H04L 43/0864
                                                   370/236
2014/0188457 A1   7/2014 Fink et al.
2014/0189074 A1\* 7/2014 Parker .................... H04L 63/20
                                                   709/220
2015/0178279 A1\* 6/2015 Chen ................... G06F 17/3053
                                                   707/748

OTHER PUBLICATIONS

Peshkin et al., "Reinforcement Learning for Adaptive Routing," Proceedings of the 2002 International Joint Conference on Neural Networks, IJCNN '02, Honolulu, HI, May 2002, pp. 1825-1830.
Boyan et al., "Packet Routing in Dynamically Changing Networks: A Reinforcement Learning Approach," Advances in Neural Information Processing Systems 6, 1994, 8 pages.

\* cited by examiner

| Relevance Scores 380 | |
|---|---|
| DESCRIPTION | SCORE |
| www.companyabc.com | 60 |
| www.companyabc.com/newtech | 80 |
| www.financials.com | 90 |
| #newtechnologies | 80 |
| #doggrooming | 50 |
| #financenews | 70 |

510 — www.companyabc.com
520 — www.companyabc.com/newtech
530 — www.financials.com
540 — #newtechnologies
550 — #doggrooming
560 — #financenews

FIG. 5

Domain Corpora
320

Organizational Needs Document 325

"Are you looking to tackle some of humanity's most challenging problems - like revolutionizing how doctors research cancer or transforming how businesses engage with their customers? We're already changing the world. Come join a team like no other!
Work on the cutting-edge of technology - we are leading the world of cognitive systems, helping computers communicate with humans and turn data to advantage.
If words like 'natural language processing', 'machine learning', 'AI' and 'algorithms' excite you, you'll be among friends. In fact, you'll work alongside the best and brightest minds in technology.
Talk about office culture! We offer the best of both worlds - the fast pace and excitement of a start-up, with the backing and resources of our large corporation.
Together we have the ability to make cognitive systems the worldwide standard in computing and change the world."

Domain Document 330

Java is a general-purpose programming language designed to be used in conjunction with Java Virtual Machine (JVM). "Java platform" is the name for computing systems that have installed tools for developing and running Java programs. Use this tag for questions referring to Java programming language

*FIG. 6*

MANAGING NETWORK BANDWIDTH BASED ON COGNITIVE ANALYSIS OF SITE CONTENT AGAINST ORGANIZATIONAL NEEDS

BACKGROUND

Bandwidth management is a process of controlling the amount of data over a computer network to avoid network congestion that results in poor performance. Quality of service (QoS) is an industry term that indicates an overall performance of a network connection. The quality of service typically incorporates several parameters to quantitatively measure the quality of the network connection such as error rates, bandwidth, throughput, transmission delay, availability, jitter, and etcetera. The quality of service of a network connection is particularly important for transporting traffic with special requirements such as real-time video streaming.

Computer network issues may affect a network connection's quality of service as packets travel from an origin to a destination. One issue that may arise is low throughput due to varying loads from disparate users sharing the same network resources. Another issue that may arise is routers dropping packets when the router buffers are full. Packet latency is another issue that may arise when packets get stored in long queues or the packets take a less direct route to avoid congestion. Packet latency is different from low throughput because the latency may build up over time even when the throughput is normal. In some cases, excessive latency can render an application such as VoIP or online gaming application unusable.

One approach to manage a computer network's quality of service is through Transmission Control Protocol (TCP) tuning. TCP tuning involves adjusting network congestion avoidance parameters to manage the quality of service for network connections. One such technique is "buffer tuning," which balances memory demand against a computer's limited resources. Another approach to manage the quality of service of a computer network is through TCP extensions such as with TCP selective acknowledgement options. The TCP selective acknowledgment options allow a TCP receiver to inform a TCP server about specific data packets that have been lost. In turn, the TCP server retransmits the specific data packets instead of an entire data segment.

BRIEF SUMMARY

According to one embodiment of the present disclosure, an approach is provided in which a network bandwidth manager receives a first request to access site content from a source site over a computer network. The network bandwidth manager analyzes the site content against a domain corpora that corresponds to one or more organizational needs of an organization. When the network bandwidth manager receives a second request corresponding to the source site, the network bandwidth manager modifies a quality of service of the computer network to access the source site based upon the previous analysis. In turn, the network bandwidth manager provides access to the source site over the computer network utilizing the modified quality of service.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

BRIEF DESCRIPTION OF THE SEVERAL VIEWS OF THE DRAWINGS

The present disclosure may be better understood, and its numerous objects, features, and advantages made apparent to those skilled in the art by referencing the accompanying drawings, wherein:

FIG. 5 is an exemplary diagram depicting domain relevance scores for site domains, specific sites, and media feed sub tags;

FIG. 6 is an exemplary diagram depicting domain corpora that includes an organizational needs document and a domain document;

DETAILED DESCRIPTION

Figure 1:
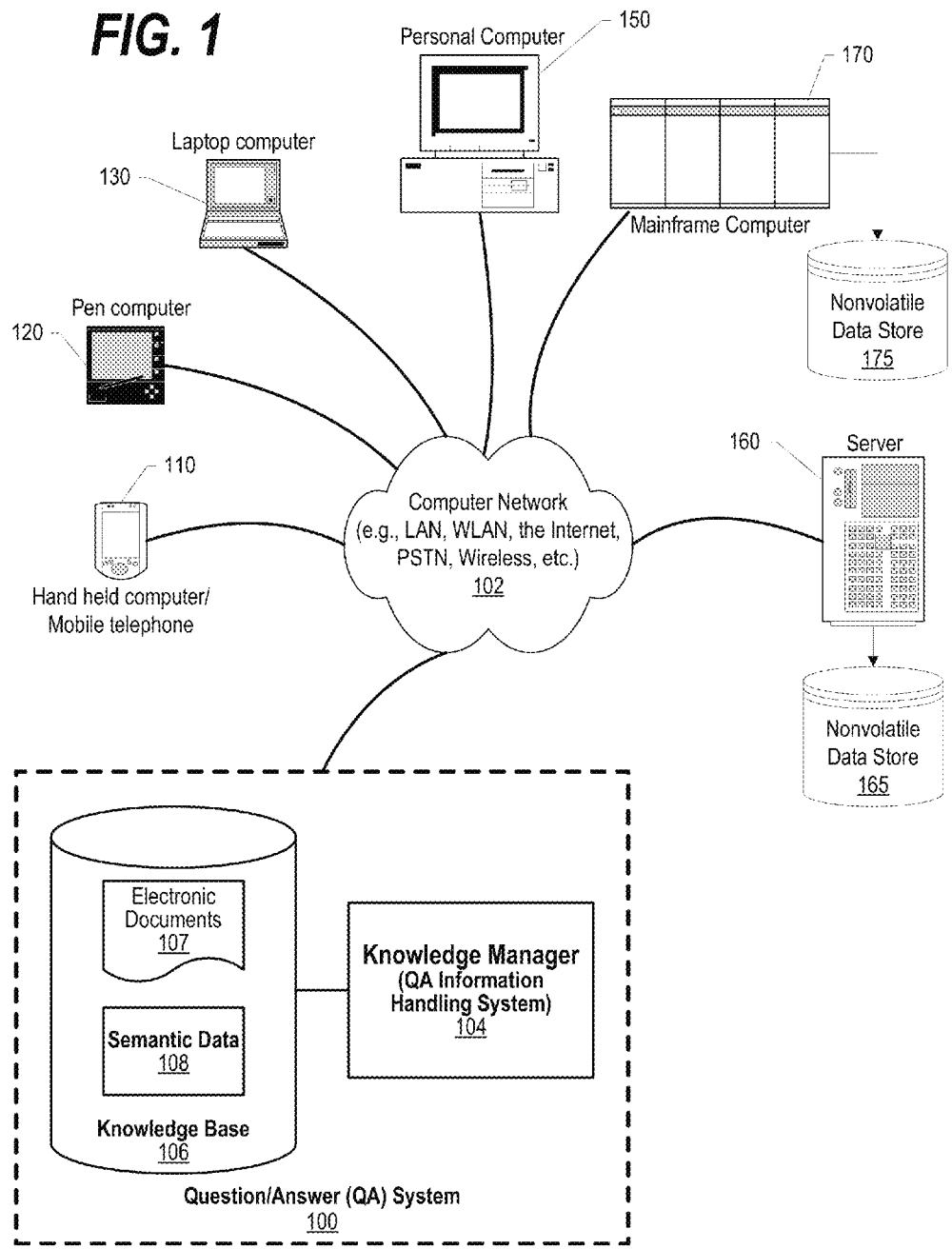
FIG. 1 depicts a schematic diagram of one illustrative embodiment of a question/answer creation (QA) system in a computer network.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. The following detailed description will generally follow the summary of the disclosure, as set forth above, further explaining and expanding the definitions of the various aspects and embodiments of the disclosure as necessary.

FIG. 1 depicts a schematic diagram of one illustrative embodiment of a question/answer (QA) system 100 in a computer network 102. QA system 100 may include knowledge manager 104, which comprises one or more processors and one or more memories, and potentially any other computing device elements generally known in the art including buses, storage devices, communication interfaces, and the like. Computer network 102 may include other computing devices in communication with each other and with other devices or components via one or more wired and/or wireless data communication links, where each communication link may comprise one or more of wires, routers, switches, transmitters, receivers, or the like. QA system 100 and network 102 may enable question/answer (QA) generation functionality for one or more content users. Other embodiments may include QA system 100 interacting with components, systems, sub-systems, and/or devices other than those depicted herein.

QA system 100 may receive inputs from various sources. For example, QA system 100 may receive input from the network 102, a corpus of electronic documents 107 or other data, semantic data 108, and other possible sources of input. In one embodiment, some or all of the inputs to QA system 100 route through the network 102 and stored in knowledge base 106. The various computing devices on the network 102 may include access points for content creators and content users. Some of the computing devices may include devices for a database storing the corpus of data. The network 102 may include local network connections and remote connections in various embodiments, such that QA system 100 may operate in environments of any size, including local and global, e.g., the Internet. Additionally, QA system 100 serves as a front-end system that can make available a variety of knowledge extracted from or represented in documents, network-accessible sources and/or structured data sources. In this manner, some processes populate the knowledge manager with the knowledge manager also including input interfaces to receive knowledge requests and respond accordingly.

In one embodiment, a content creator creates content in a document 107 for use as part of a corpus of data with QA system 100. The document 107 may include any file, text, article, or source of data for use in QA system 100. Content users may access QA system 100 via a network connection or an Internet connection to the network 102, and may input questions to QA system 100, which QA system 100 answers according to the content in the corpus of data. As further described below, when a process evaluates a given section of a document for semantic content, the process can use a variety of conventions to query it from knowledge manager 104. One convention is to send a well-formed question.

Semantic data 108 is content based on the relation between signifiers, such as words, phrases, signs, and symbols, and what they stand for, their denotation, or connotation. In other words, semantic data 108 is content that interprets an expression, such as by using Natural Language Processing (NLP). In one embodiment, the process sends well-formed questions (e.g., natural language questions, etc.) to QA system 100 and QA system 100 may interpret the question and provide a response that includes one or more answers to the question. In some embodiments, QA system 100 may provide a response to users in a ranked list of answers.

In some illustrative embodiments, QA system 100 may be the IBM Watson™ QA system available from International Business Machines Corporation of Armonk, N.Y., which is augmented with the mechanisms of the illustrative embodiments described hereafter. The IBM Watson™ knowledge manager system may receive an input question which it then parses to extract the major features of the question, that in turn are then used to formulate queries that are applied to the corpus of data. Based on the application of the queries to the corpus of data, a set of hypotheses, or candidate answers to the input question, are generated by looking across the corpus of data for portions of the corpus of data that have some potential for containing a valuable response to the input question.

The IBM Watson™ QA system then performs deep analysis on the language of the input question and the language used in each of the portions of the corpus of data found during the application of the queries using a variety of reasoning algorithms. There may be hundreds or even thousands of reasoning algorithms applied, each of which performs different analysis, e.g., comparisons, and generates a score. For example, some reasoning algorithms may look at the matching of terms and synonyms within the language of the input question and the found portions of the corpus of data. Other reasoning algorithms may look at temporal or spatial features in the language, while others may evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular domain during the training period of the IBM Watson™ QA system. The statistical model may then be used to summarize a level of confidence that the IBM Watson™ QA system has regarding the evidence that the potential response, i.e. candidate answer, is inferred by the question. This process may be repeated for each of the candidate answers until the IBM Watson™ QA system identifies candidate answers that surface as being significantly stronger than others and thus, generates a final answer, or ranked set of answers, for the input question. More information about the IBM Watson™ QA system may be obtained, for example, from the IBM Corporation website, IBM Redbooks, and the like. For example, information about the IBM Watson™ QA system can be found in Yuan et al., "Watson and Healthcare," IBM developerWorks, 2011 and "The Era of Cognitive Systems: An Inside Look at IBM Watson and How it Works" by Rob High, IBM Redbooks, 2012.

Types of information handling systems that can utilize QA system 100 range from small handheld devices, such as handheld computer/mobile telephone 110 to large mainframe systems, such as mainframe computer 170. Examples of handheld computer 110 include personal digital assistants (PDAs), personal entertainment devices, such as MP3 players, portable televisions, and compact disc players. Other examples of information handling systems include pen, or tablet, computer 120, laptop, or notebook, computer 130, personal computer system 150, and server 160. As shown, the various information handling systems can be networked together using computer network 102. Types of computer network 102 that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 1 depicts separate nonvolatile data stores (server 160 utilizes nonvolatile data store 165, and mainframe computer 170 utilizes nonvolatile data store 175. The nonvolatile data store can be a component that is external to the various information handling systems or can be internal to one of the information handling systems. An illustrative example of an information handling system showing an exemplary processor and various components commonly accessed by the processor is shown in FIG. 2.

Figure 2:
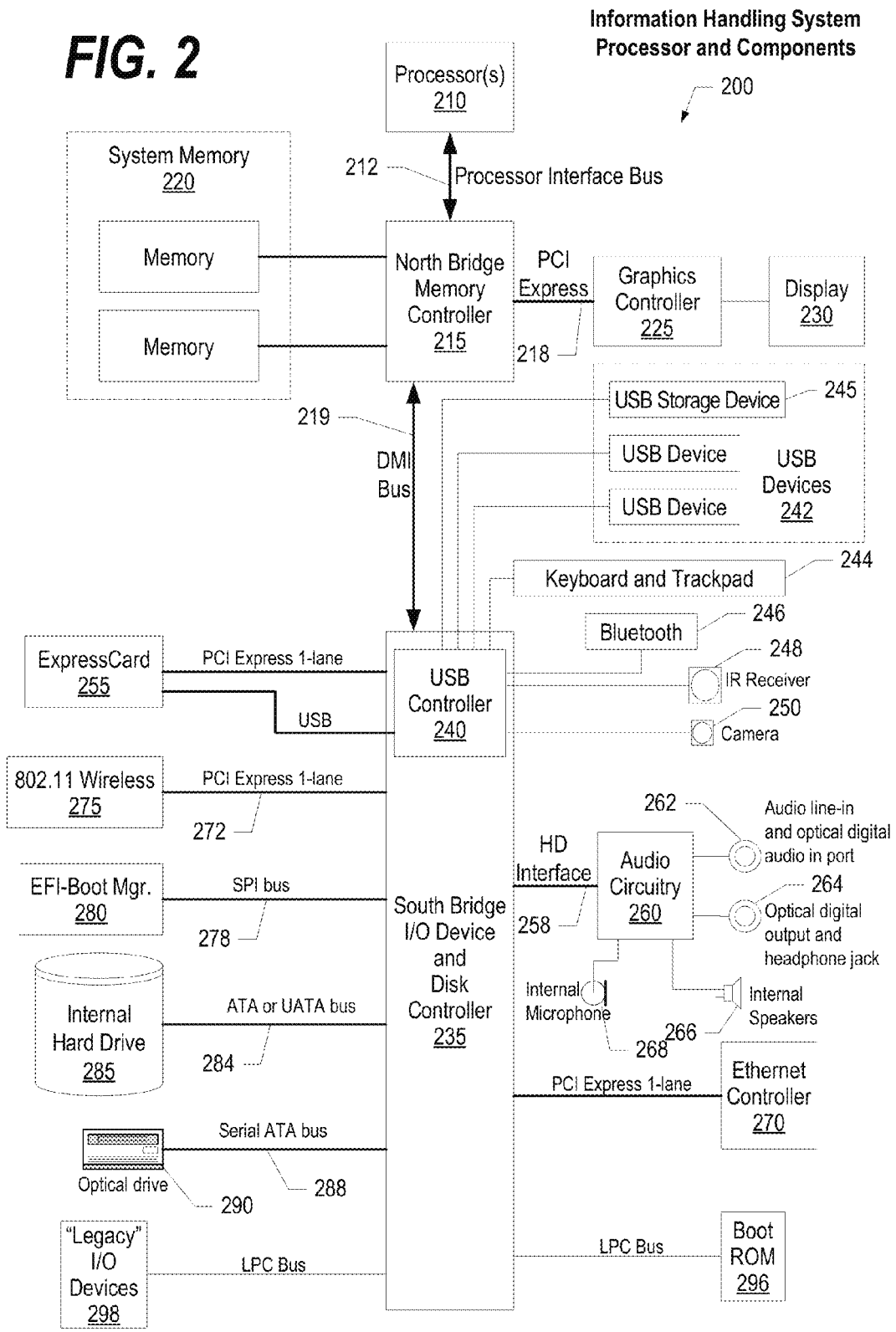
FIG. 2 illustrates an information handling system, more particularly, a processor and common components, which is a simplified example of a computer system capable of performing the computing operations described herein.

FIG. 2 illustrates information handling system 200, more particularly, a processor and common components, which is a simplified example of a computer system capable of performing the computing operations described herein. Information handling system 200 includes one or more processors 210 coupled to processor interface bus 212. Processor interface bus 212 connects processors 210 to Northbridge 215, which is also known as the Memory Controller Hub (MCH). Northbridge 215 connects to system memory 220 and provides a means for processor(s) 210 to access the system memory. Graphics controller 225 also connects to Northbridge 215. In one embodiment, PCI Express bus 218 connects Northbridge 215 to graphics controller 225. Graphics controller 225 connects to display device 230, such as a computer monitor.

Northbridge 215 and Southbridge 235 connect to each other using bus 219. In one embodiment, the bus is a Direct Media Interface (DMI) bus that transfers data at high speeds in each direction between Northbridge 215 and Southbridge 235. In another embodiment, a Peripheral Component Interconnect (PCI) bus connects the Northbridge and the Southbridge. Southbridge 235, also known as the I/O Controller Hub (ICH) is a chip that generally implements capabilities that operate at slower speeds than the capabilities provided by the Northbridge. Southbridge 235 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 296 and "legacy" I/O devices (using a "super I/O" chip). The "legacy" I/O devices (298) can include, for example, serial and parallel ports, keyboard, mouse, and/or a floppy disk controller. The LPC bus also connects Southbridge 235 to Trusted Platform Module (TPM) 295. Other components often included in Southbridge 235 include a Direct Memory Access (DMA) controller, a Programmable Interrupt Controller (PIC), and a storage device controller, which connects Southbridge 235 to nonvolatile storage device 285, such as a hard disk drive, using bus 284.

ExpressCard 255 is a slot that connects hot-pluggable devices to the information handling system. ExpressCard 255 supports both PCI Express and USB connectivity as it connects to Southbridge 235 using both the Universal Serial Bus (USB) the PCI Express bus. Southbridge 235 includes USB Controller 240 that provides USB connectivity to devices that connect to the USB. These devices include webcam (camera) 250, infrared (IR) receiver 248, keyboard and trackpad 244, and Bluetooth device 246, which provides for wireless personal area networks (PANs). USB Controller 240 also provides USB connectivity to other miscellaneous USB connected devices 242, such as a mouse, removable nonvolatile storage device 245, modems, network cards, ISDN connectors, fax, printers, USB hubs, and many other types of USB connected devices. While removable nonvolatile storage device 245 is shown as a USB-connected device, removable nonvolatile storage device 245 could be connected using a different interface, such as a Firewire interface, etcetera.

Wireless Local Area Network (LAN) device 275 connects to Southbridge 235 via the PCI or PCI Express bus 272. LAN device 275 typically implements one of the IEEE 802.11 standards of over-the-air modulation techniques that all use the same protocol to wireless communicate between information handling system 200 and another computer system or device. Optical storage device 290 connects to Southbridge 235 using Serial ATA (SATA) bus 288. Serial ATA adapters and devices communicate over a high-speed serial link. The Serial ATA bus also connects Southbridge 235 to other forms of storage devices, such as hard disk drives. Audio circuitry 260, such as a sound card, connects to Southbridge 235 via bus 258. Audio circuitry 260 also provides functionality such as audio line-in and optical digital audio in port 262, optical digital output and headphone jack 264, internal speakers 266, and internal microphone 268. Ethernet controller 270 connects to Southbridge 235 using a bus, such as the PCI or PCI Express bus. Ethernet controller 270 connects information handling system 200 to a computer network, such as a Local Area Network (LAN), the Internet, and other public and private computer networks.

While FIG. 2 shows one information handling system, an information handling system may take many forms, some of which are shown in FIG. 1. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

FIGS. 3-8 depict an approach that can be executed on an information handling system that adjusts the quality of service of a network connection based upon the relevance of the requested site content against organizational needs of an organization. A cognitive content analyzer performs cognitive analysis of a requested site's content and the site content's relationship to corporate needs defined in a natural language. The cognitive content analyzer generates a domain relevance score and, in turn, a network bandwidth manager adjusts the quality of service level for subsequent site content requests based on the domain relevance score.

In one embodiment, the cognitive content analyzer creates a domain vocabulary based upon ingesting domain corpora that includes organizational needs documents and domain documents written in a natural language. In turn, when a requestor accesses a site for the first time, the network bandwidth manager allows the site content to pass to the requestor at a default quality of service (QoS). In parallel, the cognitive content analyzer analyzes the site content against the domain vocabulary and generates the domain relevance score accordingly. When the network bandwidth manager receives subsequent requests corresponding to the site, the network bandwidth manager locates the domain relevance score and adjusts the quality of service level of the network connection to the site based on the located domain relevance score.

In another embodiment, a requestor may request a trending social media feed. In this embodiment, the cognitive content analyzer analyzes the social media feed, as well as linked sub tags (e.g., hashtags), to generate domain relevance scores for the social media feed and sub tags accordingly.

Figure 3:
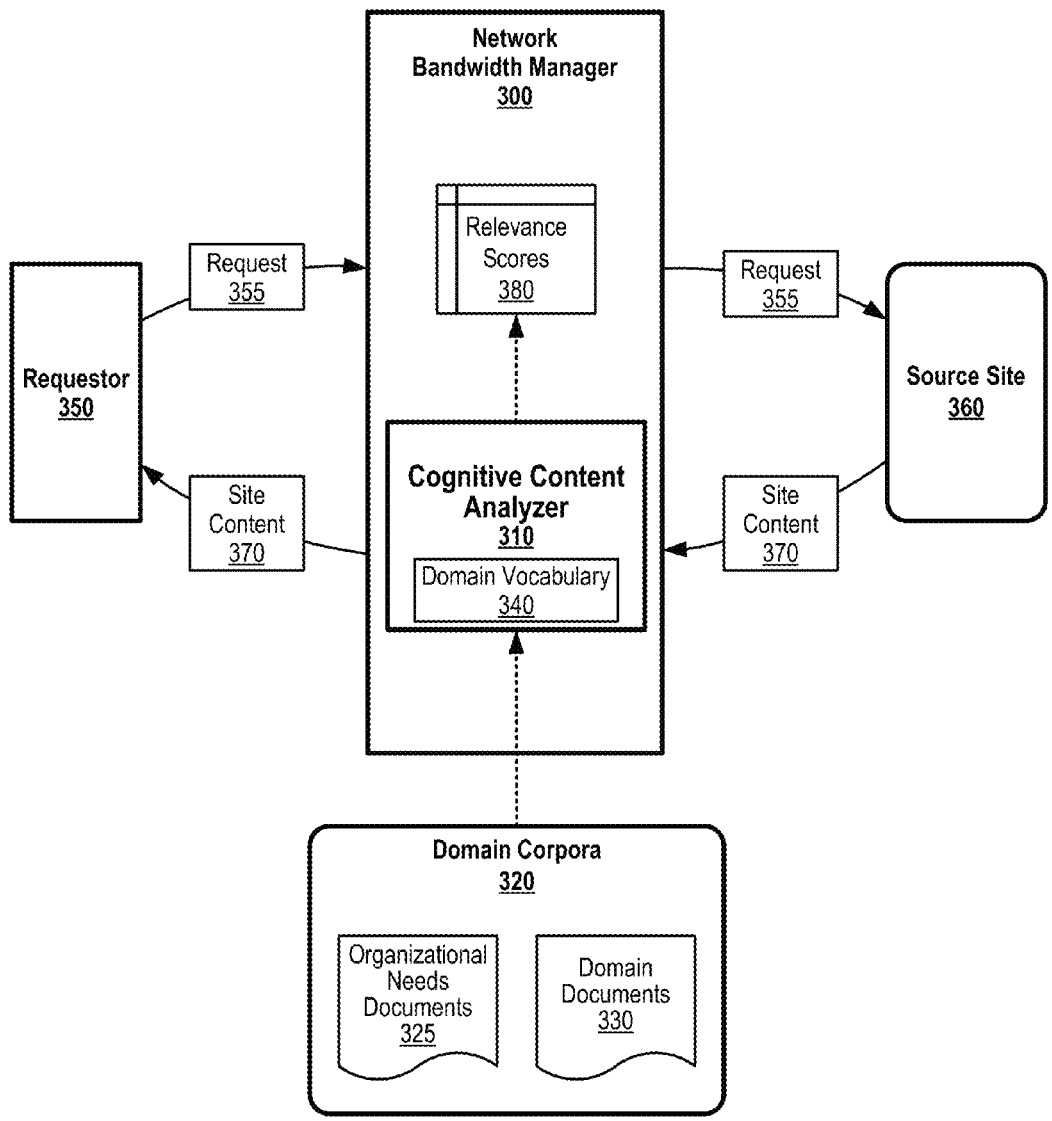
FIG. 3 is an exemplary diagram depicting a network bandwidth manager that adjusts network quality of service levels based upon the relevance of site content compared against organizational needs.

FIG. 3 is an exemplary diagram depicting a network bandwidth manager that adjusts network quality of service levels based upon the relevance of site content compared against organizational needs. Network bandwidth manager 300 includes cognitive content analyzer 310, which analyzes the site content at source site 360 against the organizational needs of an organization and generates a domain relevance score accordingly. In turn, network bandwidth manager 300 increases/decreases the quality of service between requestor 350 and source site 360 based upon the generated domain relevance score.

Cognitive content analyzer 310 first ingests domain corpora 320, which includes organizational needs documents 325 and domain documents 330 written in a natural language (see FIG. 6 and corresponding text for further details). Cognitive content analyzer 310 analyzes domain corpora 320 against common terms and generates domain vocabulary 340, which includes organizational needs specific terms and definitions (see FIG. 7 and corresponding text for further details).

When network bandwidth manager 300 receives request 355 from requestor 350 to access source site 360, network bandwidth manager 300 identifies the site domain corresponding to request 355 and determines if a domain relevance score is stored in relevance scores 360, indicating that the site domain was previously visited. For example, request 355 may include the address "financetoday.com/journals" and network bandwidth manager 300 determines that "financetoday.com" is the site domain. In this example, network bandwidth manager 300 accesses relevance scores 380 to check whether a domain relevance score exists for "financetoday.com."

Figure 8:
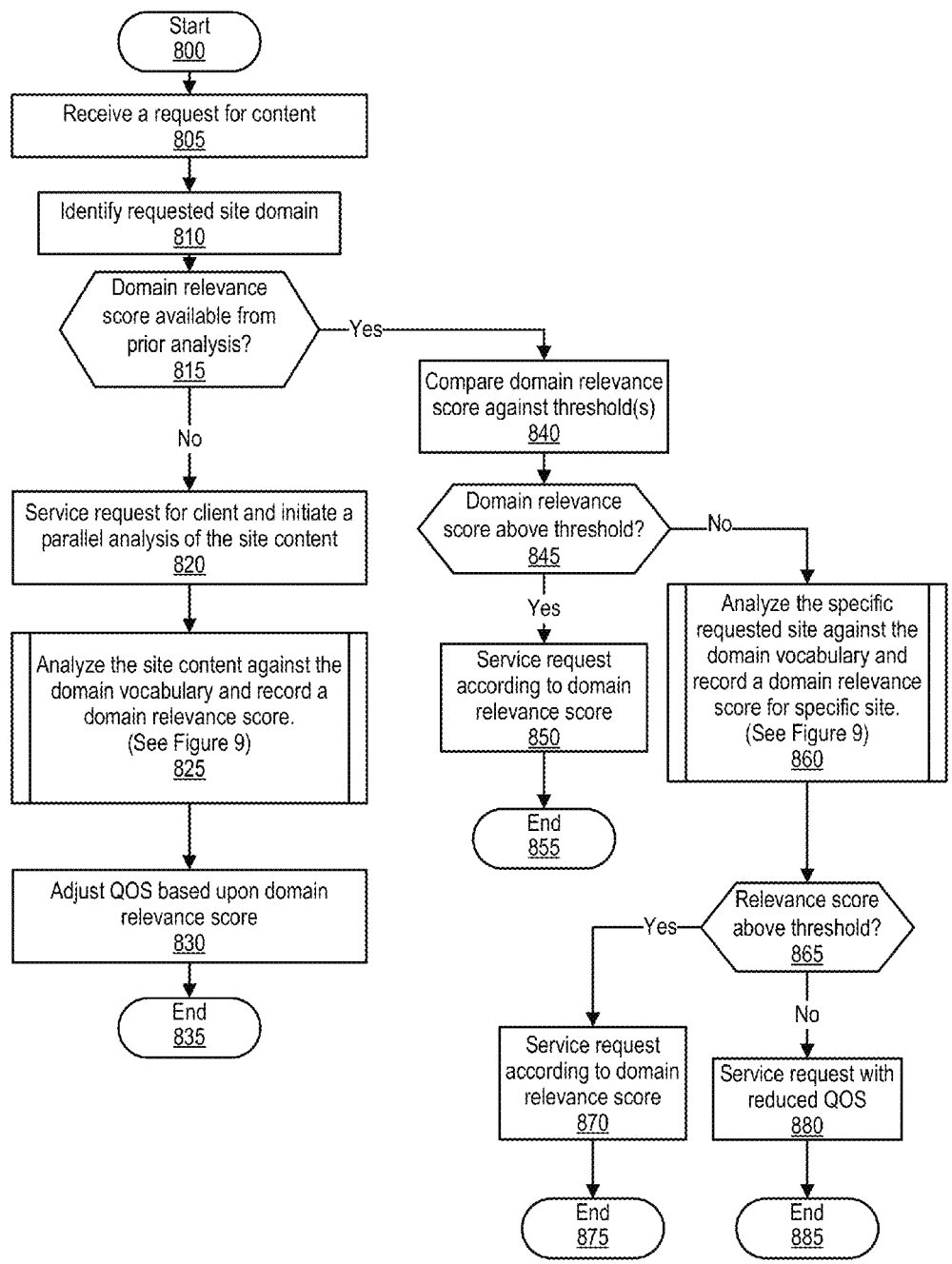
FIG. 8 is an exemplary flowchart depicting steps to manage the quality of service of a network connection based upon the site requested by a user.
Figure 9:
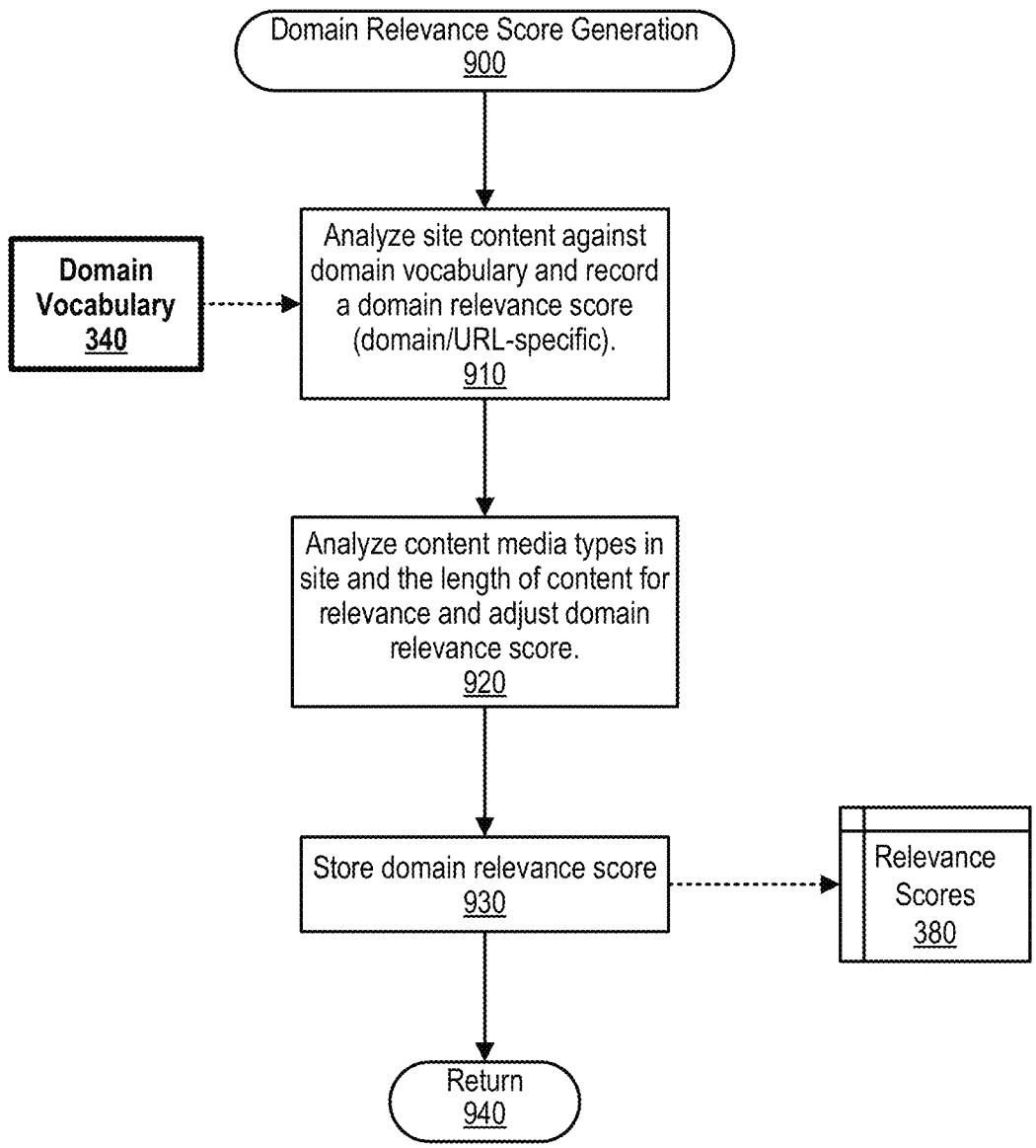
FIG. 9 is an exemplary flowchart depicting steps to generate a domain relevance score for a source site based upon comparing site content against a domain vocabulary corresponding to organizational needs of an organization.

If network bandwidth manager 300 does not locate a corresponding domain relevance score, network bandwidth manager 300 provides site content 370 to requestor 350 while cognitive content analyzer 310 analyzes site content 370 against domain vocabulary 340 to determine a domain relevance score for source site 360 (see FIGS. 8, 9, and corresponding text for further details). Cognitive content analyzer 310 stores the domain relevance score in relevance scores 360, which network bandwidth manager 300 utilizes to adjust the quality of service level to access source site 360 during subsequent requests from requestors in the organization.

In one embodiment, network bandwidth manager 300 may utilize several tiers of quality of service, each corresponding to a range of domain relevance scores. For example, network bandwidth manager 300 may set different relevance score thresholds of 60, 80, and 90. In this example, network bandwidth manager provides a reduced quality of service for scores less than 60, provides a default quality of service level for scores between 60 and 80, provides an increased quality of service level for scores between 80 and 90, and provides a high performance quality of service level for scores above 90.

In another embodiment, when network bandwidth manager 300 identifies a reduced domain relevance score for a site domain, network bandwidth manager 300 may instruct cognitive content analyzer 310 to analyze content specific to the site address included in request 355. For example, relevance scores 380 may include a low domain relevance score for a site domain of "fashion.com," but request 355 may include a site address of "fashion.com/wearabletechnologies," which may be highly relevant to the organizational needs of an organization. In this example, cognitive content analyzer 310 analyzes the content corresponding to fashion.com/wearabletechnologies and generates a domain relevance score accordingly (see FIG. 8 and corresponding text for further details).

Figure 4:
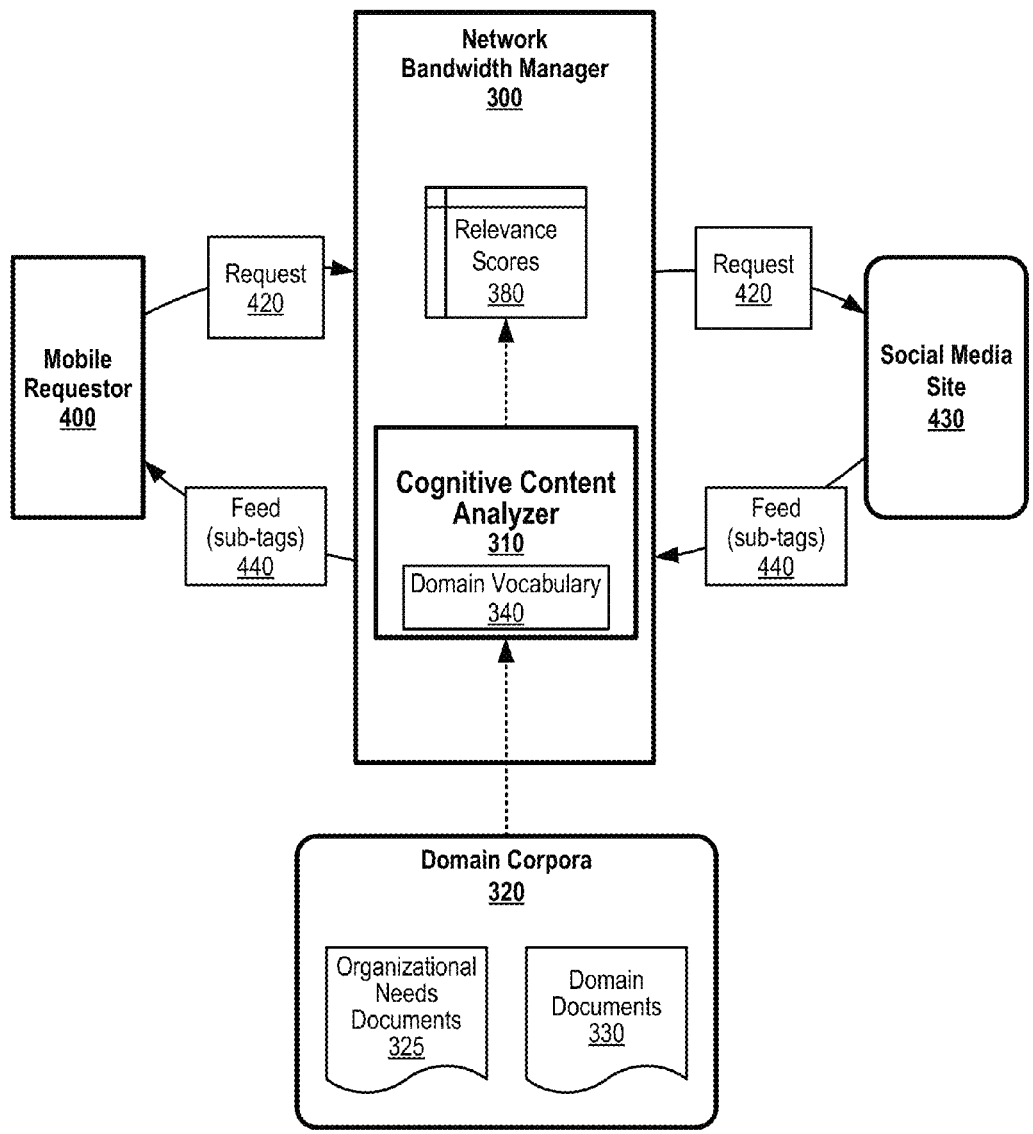
FIG. 4 is an exemplary diagram depicting a cognitive content analyzer analyzing a requested media feed and sub tags associated with the media feed.

FIG. 4 is an exemplary diagram depicting a cognitive content analyzer analyzing a requested media feed and sub tags associated with the media feed. FIG. 4 shows an embodiment of mobile requestor 400 requesting a media feed (request 420) from social media site 430. Network bandwidth analyzer 300 performs steps similar to that discussed above and checks relevance scores 380 for a domain relevance score corresponding to the site domain of social media site 430. When network bandwidth manager 300 does not locate a domain relevance score, network bandwidth manager 300 passes feed 440 to mobile requestor 400 while cognitive content analyzer 310 analyzes the content in feed 440 against domain vocabulary 340. Cognitive content analyzer 310, in turn, stores the domain relevance score in relevance scores 380.

In one embodiment, network bandwidth manager 300 adjusts the existing quality of service of feed 440, as well as subsequent accesses, based upon the newly generated domain relevance score. In addition, cognitive content analyzer 310 identifies sub-tags (e.g., hash tags) associated with feed 440 and generates domain relevant scores for the sub-tags. For example, social media site may have a domain relevance score of 60, but cognitive content analyzer 310 may assign a domain relevance score of 80 to an associated hashtag of "#newtechnologies."

FIG. 5 is an exemplary diagram depicting domain relevance scores for site domains, specific sites, and media feed sub tags. Cognitive content analyzer 310 analyzes content against domain vocabulary 340 to generate relevance scores shown in relevance scores 380. In one embodiment, the higher the relevance score, the more correlation, or relevance, exists between the corresponding site content and domain vocabulary 340. For example, row 510 shows that the site content in www.companyabc.com has a score of 60 but row 530 shows that the site content in www.financials.com generated a domain relevance score of 90. This indicates that the site content in www.financials.com is more relevant to the organization's organizational needs and, in turn, network bandwidth manager 300 increases the quality of service to access www.financials.com.

In one embodiment, a source site may have a low domain relevance score (row 510), but a specific web page within the site may have a higher domain relevance score when the web page includes content that is more relevant to the organizational needs of the organization. For example, row 520 shows that the specific site of "www.companyabc.com.newtech" has a higher domain relevance score than the domain relevance score of the site domain shown in row 510.

In another embodiment, cognitive content analyzer 310 analyzes media feeds as well as sub tags linked to the media feeds. Rows 540, 550, and 560 show that the hashtags #newtechnologies and #financenews generated high domain relevance scores, whereas #doggromming generated a low domain relevance score. As such, when network bandwidth manager 300 receives a request for media feeds corresponding to #newtechnologies or #financenews, network bandwidth manager 300 increases the quality of service of the network connection accordingly. Likewise, network bandwidth manager 300 decreases the quality of service of a network connection for media feeds corresponding to the hash tag #doggromming.

FIG. 6 is an exemplary diagram depicting domain corpora that includes an organizational needs document and a domain document. Organizational needs document 325 includes organizational needs of an organization (e.g., job description) written in a natural language. When cognitive content analyzer 300 ingests organizational needs document 325, cognitive content analyzer 300 identifies key concepts such as natural language processing, machine learning, artificial intelligence, algorithms, cancer, technology, cognitive, computers, and systems. In turn, cognitive content analyzer 300 adds these key concepts to domain vocabulary 340.

Likewise, when cognitive content analyzer 300 ingests domain document 330, cognitive content analyzer 300 identifies key concepts such as Java, language, platform, computing, developing, and program. In one embodiment, domain corpora 320 may include hundreds of organizational needs documents and thousands of domain documents. In this embodiment, cognitive content analyzer 310 builds and refines domain vocabulary 340 based on analyzing the different organizational needs documents and domain documents.

Figure 7:
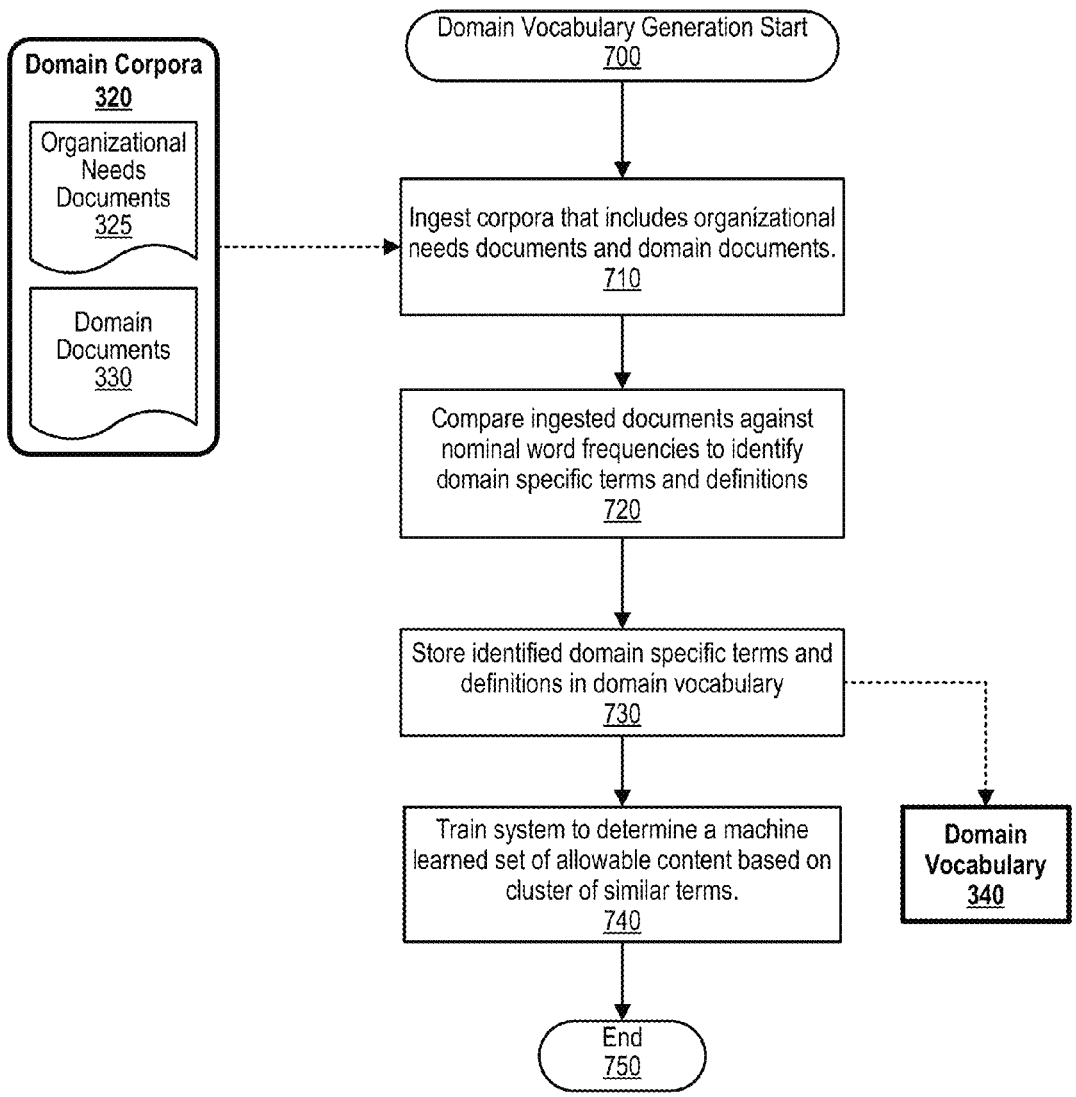
FIG. 7 is an exemplary flowchart depicting steps to generate an organizational needs domain vocabulary that a cognitive content analyzer utilizes to generate domain relevance scores of site content.

FIG. 7 is an exemplary flowchart depicting steps to generate an organizational needs domain vocabulary that a cognitive content analyzer utilizes to generate domain relevance scores of site content. Processing commences at 700, whereupon the process ingests domain corpora 320 that includes organizational needs documents 325 and domain documents 330 (step 710). In one embodiment, the ingested documents are written in a natural language format such as those shown in FIG. 6.

The process compares the ingested documents against nominal word frequencies from common documents to identify domain specific terms and definitions at step 720. For example, the process may compare domain corpora 320 against newspaper articles, magazines, etc. to identify terms utilized more often in domain corpora 320 when compared against the common documents.

At step 730, the process stores the identified domain specific terms and definitions in domain vocabulary 340. Using the example above, the process may determine that a nominal frequency use of the term "quality" appears once every 200 words in the common documents but appears once every 50 words in domain corpora 320. In this example, the process determines that "quality" is a domain specific term for the organizational needs domain vocabulary for which cognitive content analyzer 310 is training.

The process, at step 740, trains cognitive content analyzer 330 to identify a machine learned set of allowable content based on a cluster of similar terms in domain vocabulary 340. In one embodiment, the process trains cognitive content analyzer 330 using a set of ground truths that include organizational needs documents and domain documents with an expected relevance range and similarity terms. During training, the process monitors cognitive content analyzer 330 to ensure that cognitive content analyzer 330 identifies the expected relevance range and similarity terms over multiple domain documents and organizational needs documents. FIG. 7 processing thereafter ends at 750 and the process utilizes domain vocabulary 340 as a basis to generate domain relevance scores discussed in more detail below.

FIG. 8 is an exemplary flowchart depicting steps to manage the quality of service of a network connection based upon the site requested by a user. FIG. 8 commences at 800, whereupon the process receives a request for content at step 805. For example, the process may receive a request with a URL address of "companyABC.com/newtechnologies." At step 810, the process identifies a site domain of the requested content, such as "companyABC.com."

The process determines as to whether the process previously generated a domain relevance score for the site domain, such as by searching relevance scores 380 shown in FIG. 3 (decision 815). For example, a requestor may have visited "companyABC.com/pressreleases" and the process analyzed companyABC.com's site content per steps shown in FIG. 9 to generate a domain relevance score.

If the process did not locate a domain relevance score for the site domain, decision 815 branches to the 'no' branch. At step 820, the process services the request for the requestor (e.g., retrieves site content) at a default quality of service level and initiates a concurrent analysis of the site content at predefined process 825. At predefined process block 825, the process analyzes the site content by comparing the site content against domain vocabulary 340 to generate a domain relevance score (see FIG. 9 and corresponding text for processing details). The domain vocabulary corresponds to domain documents and organizational needs documents that emphasize an organization's needs as shown in FIG. 6.

At step 830, in one embodiment, the process adjusts the quality of service of the existing network link to the requested site based upon the domain relevance score. For example, the process may determine that the requested site is not applicable to the organizational needs of a particular corporation. In this example, the process may reduce the quality of service to the requested site. FIG. 8 processing thereafter ends at 835.

Referring back to decision 815, if the process locates a domain relevance score corresponding to the identified site domain, then decision 815 branches to the 'yes' branch. At step 840, the process compares the domain relevance score against one or more thresholds, such as a reduced QoS threshold, a default QoS threshold, and a high performance QoS threshold. The process, in turn, determines whether the domain relevance score is above one of the thresholds, such as above the reduced QoS threshold (decision 845). For example, the process may set a reduced QOS threshold of 60 and network bandwidth manager 300 provides access to site domains with a corresponding domain relevance scores below 60 at a reduced quality of service level.

If the site domain's relevance score is above the predefined threshold (e.g., 60), then decision 845 branches to the 'yes' branch. At step 850, the process services request according to the domain relevance score. For example above, the process may provide a default quality of service level for scores between 60 and 80, and provide an increased quality of service level when the domain relevance score is above 80. FIG. 8 processing thereafter ends at 855.

On the other hand, if the site domain does not have a corresponding domain relevance score above the threshold, then decision 845 branches to the 'no' branch. At predefined process 860, the process analyzes the specific requested site (URL tokens) against the domain corpora to generate a domain relevance score for the specific site (see FIG. 9 and corresponding text for processing details). For example, a site domain of "fashion.com" may have a low domain relevance score but a requested site of "fashion.com/wearabletechnologies" may generate a high domain relevance score.

The process determines as to whether the site-specific analysis results in a domain relevance score above the threshold (decision 865). If the process generates a domain relevance score above the threshold, then decision 865 branches to the 'yes' branch. At step 870, the process services request according to domain relevance score, such as at the default quality of service level (e.g., score between 60 and 80) or at an increased quality of service level (e.g., score above 80). FIG. 8 processing thereafter ends at 875.

On the other hand, if the domain relevance score is not above the threshold, then decision 865 branches to the 'no' branch whereupon, at step 880, the process services request with a reduced quality of service level. FIG. 8 processing thereafter ends at 885.

FIG. 9 is an exemplary flowchart depicting steps to generate a domain relevance score for a source site based upon comparing site content against a domain vocabulary that corresponds to organizational needs of an organization. FIG. 9 commences at 900, whereupon the process analyzes the site content against domain vocabulary 340 and records a domain relevance score at step 910. In one embodiment, the process performs a similarity match during the analysis between core terms in domain vocabulary 340 and the site content. In this embodiment, the process provides a higher weighting to site content terms that are a direct match to core terms and provides a medium match to site content terms that are synonyms of the core terms. In another embodiment, the process performs sentence similarity between domain vocabulary 340 and the site content and provides a score for similar sentences. In turn, the process aggregates the sentence similarity scores and the similarity matched scores into a domain relevance score.

In yet another embodiment, the process uses machine learned organizational needs with domain terms scoring to augment the domain relevance score. For example, the organizational needs document may include a high frequency or core terms such as java, programming, healthcare, treatment, analysis, integration, etc., and the domain document may discuss treatment options for cancer that includes terms such as treatment, health, patient, symptoms, etc. In this example, the process matches sentences in the organizational needs document such as "The team needs to find treatment for patients with cancer and the possible symptoms", while the site content includes a sentence such as "The doctor can find treatment for patients with lung cancer by looking at the symptoms from a biopsy." Using sentence similarity, the process provides a high score to matching sentences with only a few words out of place.

At step 920, the process analyzes content media types (e.g., audio data or video data) identified in the source site against domain vocabulary 340 and adjusts the domain relevance score accordingly. For example, the source site may include a video that discusses future technologies and their integration into consumer devices. In this example, the process may analyze the video's audio and/or video stream and increase or decrease the domain relevance score based upon the correlation of the audio/video content against domain vocabulary 340.

At step 930, the process stores the domain relevance score in relevance scores 380. FIG. 9 processing thereafter returns to the calling routine (see FIG. 8) at 940.

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to disclosures containing only one such element, even when the same claim includes the introductory phrases "one or more" or "at least one" and indefinite articles such as "a" or "an"; the same holds true for the use in the claims of definite articles.

The invention claimed is:

1. A method implemented by an information handling system that includes a memory and a processor, the method comprising:
   receiving a first request that requests content from a site domain address over a computer network;
   assigning a domain relevance score to the site domain address based on analyzing the requested content against an organizational domain corpora that corresponds to one or more organizational needs of an organization;
   in response to receiving a second request that includes the site domain address:
   assigning the domain relevance score to the second request in response to detecting the second request includes the site domain address;
   modifying a quality of service of the computer network based on the domain relevance score; and
   fulfilling the second request by providing access to the requested content over the computer network utilizing the modified quality of service;
   receiving a third request that includes a requested address comprising a path appended to the site domain address that points to a page of data;
   in response to determining that the domain relevance score does not meet a threshold:
   generating a different domain relevance score based upon analyzing the page of data; and
   performing the modifying of the quality of service based upon the different domain relevance score.

2. The method of claim 1 wherein, prior to the analyzing of the requested content, the method further comprises:
   ingesting one or more organizational needs documents written in a natural language format and one or more domain documents written in the natural language format;
   identifying one or more vocabulary terms and one or more corresponding vocabulary definitions based upon the ingested one or more organizational needs documents and the one or more domain documents; and
   storing the one or more vocabulary terms and the one or more corresponding vocabulary definitions in a domain vocabulary, wherein the analyzing comprises comparing the domain vocabulary to the requested content.

3. The method of claim 1 wherein the domain relevance score indicates an amount of correlation of the requested content to the organizational needs of the organization.

4. The method of claim 1 wherein the site domain address points to a social media site and wherein the requested content is a media feed, the method further comprising:
   extracting one or more sub-tags from the media feed; and generating one or more subsequent domain relevance scores to correspond with the one or more sub-tags in response to analyzing the one or more sub-tags against the domain corpora.

5. The method of claim 4 further comprising:
receiving a subsequent request that corresponds to a selected one of the one or more sub-tags; and
providing access to a different media feed corresponding to the selected sub-tag at a quality of service level that is based upon the corresponding one or more subsequent domain relevance scores.

6. The method of claim 1 wherein the requested content includes media content selected from the group consisting of audio data and video data, the method further comprising:
adjusting the domain relevance score in response to analyzing the media content against the domain corpora.

7. The method of claim 1 wherein the source content is written in a natural language format.

8. The method of claim 1 wherein the modifying of the quality of service is selected from the group consisting of reducing the quality of service of a network connection to the site source and increasing the quality of service of the network connection to the site source.

9. An information handling system comprising:
one or more processors;
a memory coupled to at least one of the processors; and
a set of computer program instructions stored in the memory and executed by at least one of the processors in order to perform actions of:
receiving a first request that requests content from a site domain address over a computer network;
assigning a domain relevance score to the site domain address based on analyzing the requested content against an organizational domain corpora that corresponds to one or more organizational needs of an organization; in response to receiving a second request that includes the site domain address:
assigning the domain relevance score to the second request in response to detecting the second request includes the site domain address;
modifying a quality of service of the computer network based on the domain relevance score; and
fulfilling the second request by providing access to the requested content over the computer network utilizing the modified quality of service;
receiving a third request that includes a requested address comprising a path appended to the site domain address that points to a page of data;
in response to determining that the domain relevance score does not meet a threshold:
generating a different domain relevance score based upon analyzing the page of data; and
performing the modifying of the quality of service based upon the different domain relevance score.

10. The information handling system of claim 9 wherein, prior to the analyzing of the requested content, the one or more processors perform additional actions comprising:
ingesting one or more organizational needs documents written in a natural language format and one or more domain documents written in the natural language format;
identifying one or more vocabulary terms and one or more corresponding vocabulary definitions based upon the ingested one or more organizational needs documents and the one or more domain documents; and
storing the one or more vocabulary terms and the one or more corresponding vocabulary definitions in a domain vocabulary, wherein the analyzing comprises comparing the domain vocabulary to the site content.

11. The information handling system of claim 9 wherein the domain relevance score indicates an amount of correlation of the requested content to the organizational needs of the organization.

12. The information handling system of claim 9 wherein the site domain address points to a social media site and wherein the requested content is a media feed, and wherein the one or more processors perform additional actions comprising:
extracting one or more sub-tags from the media feed; and
generating one or more subsequent domain relevance scores to correspond with the one or more sub-tags in response to analyzing the one or more sub-tags against the domain corpora.

13. The information handling system of claim 12 wherein the one or more processors perform additional actions comprising:
receiving a subsequent request that corresponds to a selected one of the one or more sub-tags; and
providing access to a different media feed corresponding to the selected sub-tag at a quality of service level that is based upon the corresponding one or more subsequent domain relevance scores.

14. A computer program product stored in a computer readable storage medium, comprising computer program code that, when executed by an information handling system, causes the information handling system to perform actions comprising:
receiving a first request that requests content from a site domain address over a computer network;
assigning a domain relevance score to the site domain address based on analyzing the requested content against an organizational domain corpora that corresponds to one or more organizational needs of an organization;
in response to receiving a second request that includes the site domain address:
assigning the domain relevance score to the second request in response to detecting the second request includes the site domain address;
modifying a quality of service of the computer network based on the domain relevance score; and
fulfilling the second request by providing access to the requested content over the computer network utilizing the modified quality of service;
receiving a third request that includes a requested address comprising a path appended to the site domain address that points to a page of data;
in response to determining that the domain relevance score does not meet a threshold:
generating a different domain relevance score based upon analyzing the page of data; and
performing the modifying of the quality of service based upon the different domain relevance score.

15. The computer program product of claim 14 wherein, prior to the analyzing of the requested content, the information handling system performs additional actions comprising:
ingesting one or more organizational needs documents written in a natural language format and one or more domain documents written in the natural language format;

identifying one or more vocabulary terms and one or more corresponding vocabulary definitions based upon the ingested one or more organizational needs documents and the one or more domain documents; and storing the one or more vocabulary terms and the one or more corresponding vocabulary definitions in a domain vocabulary, wherein the analyzing comprises comparing the domain vocabulary to the site content.

16. The computer program product of claim 14 wherein the domain relevance score indicates an amount of correlation of the site requested content to the organizational needs of the organization.

17. The computer program product of claim 14 wherein the site domain address points to a social media site and wherein the requested content is a media feed, and wherein the information handling system performs additional actions comprising:

extracting one or more sub-tags from the media feed; and generating one or more subsequent domain relevance scores to correspond with the one or more sub-tags in response to analyzing the one or more sub-tags against the domain corpora.

\* \* \* \* \*